US010320978B2

(12) United States Patent
Collinson et al.

(10) Patent No.: US 10,320,978 B2
(45) Date of Patent: *Jun. 11, 2019

(54) CALL FILTERING TO A USER EQUIPMENT

(71) Applicant: International Business Machines Corporation, Armonk, NY (US)

(72) Inventors: Henry J. Collinson, Hursley (GB); Julie E. Stalley, Hampshire (GB); Tom Waterton, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/947,937

(22) Filed: Apr. 9, 2018

(65) Prior Publication Data

US 2018/0288223 A1    Oct. 4, 2018

Related U.S. Application Data

(63) Continuation of application No. 15/471,350, filed on Mar. 28, 2017, now Pat. No. 10,009,462.

(51) Int. Cl.
| | |
|---|---|
| *H04M 1/56* | (2006.01) |
| *H04M 15/06* | (2006.01) |
| *H04M 3/436* | (2006.01) |
| *H04M 3/42* | (2006.01) |
| *H04M 1/663* | (2006.01) |

(52) U.S. Cl.
CPC ........... *H04M 3/436* (2013.01); *H04M 1/663* (2013.01); *H04M 3/42059* (2013.01); *H04M 2203/2094* (2013.01)

(58) Field of Classification Search
CPC .................. H04L 67/02; H04L 69/329; H04M 2203/553; H04M 3/42059; H04M 3/42136; H04M 3/42068; H04M 1/56; H04M 67/104; G06Q 17/30864; G06Q 10/10
USPC ............ 379/142.01, 142.02, 142.04, 142.06, 379/142.07, 142.15, 142.17
See application file for complete search history.

(56) References Cited

U.S. PATENT DOCUMENTS

| | | | |
|---|---|---|---|
| 5,661,788 A | 8/1997 | Chin | |
| 7,756,756 B1* | 7/2010 | Lifson | G06Q 30/0601 705/26.1 |
| 8,181,218 B2* | 5/2012 | Asmussen | H04N 7/147 348/552 |
| 8,345,844 B2* | 1/2013 | Sanmugasuntharam | H04M 3/02 370/352 |

(Continued)

OTHER PUBLICATIONS

Fatima Wahab, Jul. 23, 2014, Essential Calls: Allow Your Phone to Ring Only If It's Important [Android], 4 pages.

(Continued)

*Primary Examiner* — Binh Kien Tieu
(74) *Attorney, Agent, or Firm* — Schmeiser, Olson & Watts, LLP; William Hartwell

(57) ABSTRACT

A user equipment and method for call filtering is provided. On receipt of an incoming call, the incoming call's telephone number or other caller identifier is determined and then used as a search query in a search engine search. Using natural language processing or text string comparison, text from the search hits is processed by comparing with the stored permitted caller description(s). If a match is found, then a call alert is generated, whereas if not, then the call is blocked.

20 Claims, 7 Drawing Sheets

(56) References Cited

U.S. PATENT DOCUMENTS

| | | | |
|---|---|---|---|
| 9,262,455 B2* | 2/2016 | Palay | H04L 51/16 |
| 9,462,105 B2 | 10/2016 | Feller | |
| 2003/0026403 A1 | 2/2003 | Clapper | |
| 2005/0144249 A1 | 6/2005 | Alex et al. | |
| 2006/0123053 A1* | 6/2006 | Scannell, Jr. | G06F 16/9577 |
| 2008/0037716 A1* | 2/2008 | Bran | H04M 1/72547 |
| | | | 379/67.1 |
| 2008/0152097 A1 | 6/2008 | Kent | |
| 2013/0095798 A1 | 4/2013 | Martin | |
| 2014/0044246 A1 | 2/2014 | Klemm et al. | |
| 2014/0120885 A1* | 5/2014 | Luneau | H04M 3/2281 |
| | | | 455/414.1 |
| 2016/0150079 A1 | 5/2016 | Vaananen | |
| 2016/0156757 A1 | 6/2016 | Kotab | |
| 2017/0302794 A1* | 10/2017 | Spievak | H04M 3/436 |
| 2018/0007190 A1* | 1/2018 | Vendrow | H04L 65/403 |

OTHER PUBLICATIONS

Office Action (Sep. 18, 2017) for U.S. Appl. No. 15/471,350, filed Mar. 28, 2017.
Amendment (Dec. 18, 2017) for U.S. Appl. No. 15/471,350, filed Mar. 28, 2017.
Notice of Allowance (Feb. 22, 2018) for U.S. Appl. No. 15/471,350, filed Mar. 28, 2017.

\* cited by examiner

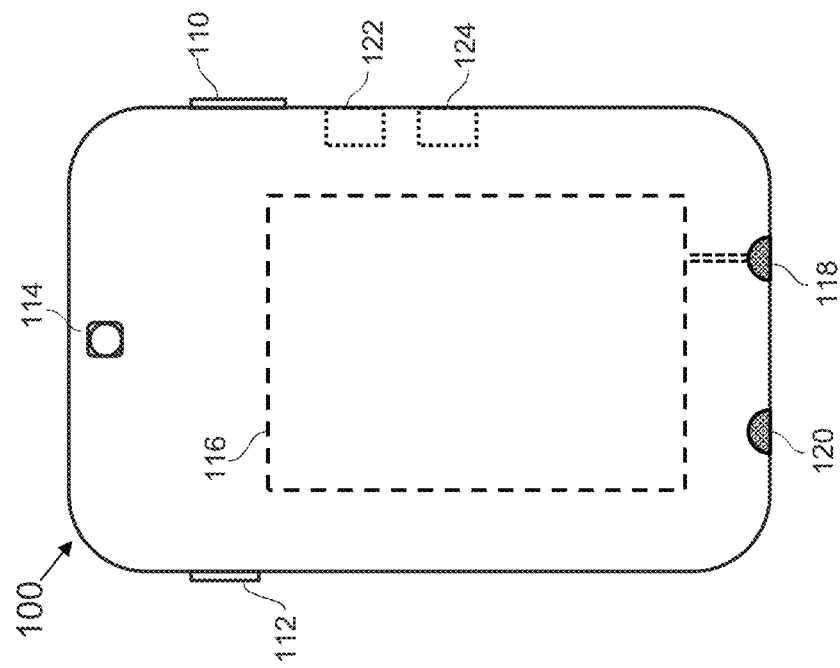
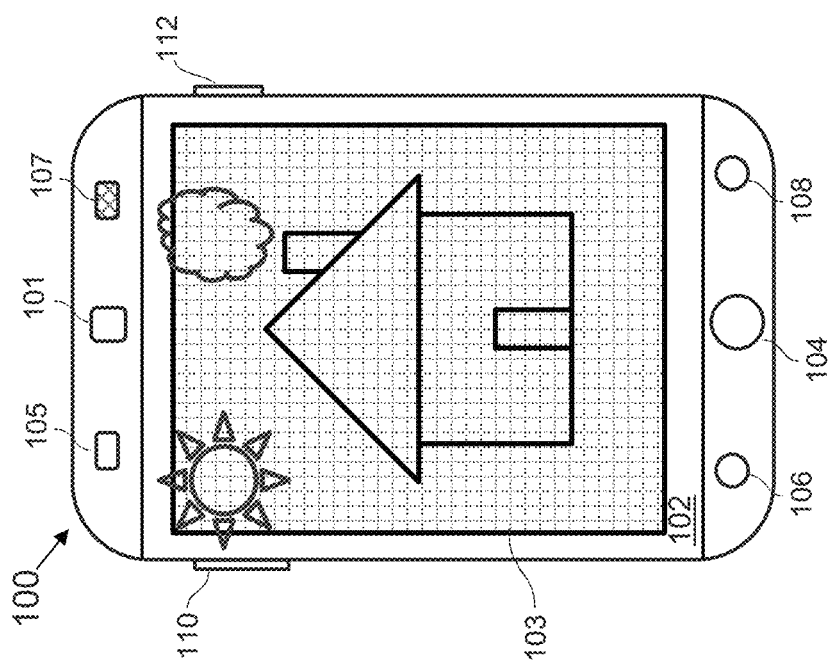

CALL FILTERING TO A USER EQUIPMENT

This application is a continuation application claiming priority to Ser. No. 15/471,350, filed Mar. 28, 2017, now U.S. Pat. No. 10,009,462, issued Jun. 26, 2018.

TECHNICAL FIELD

The present invention relates to filtering incoming calls to a user equipment such as a telephone handset.

BACKGROUND

Nuisance calls are a significant problem for telephone users, for example, unsolicited calls attempting to sell a product or service.

SUMMARY

A user equipment, method, and computer program product for call filtering is provided. A processor of a computing system detects an incoming call. A caller identifier of the incoming call is determined. A search is performed by providing the caller identifier to a search engine as a search query and receiving at least one hit of the search engine. The search text in the at least one hit found by the search engine is identified. The search text is compared with one or more permitted caller descriptions stored in the user equipment to attempt to find a match, and a call alert is generated conditional on a match being found

BRIEF DESCRIPTION OF THE DRAWINGS

FIG. 1A is a schematic view of a front of a handheld touchscreen computing device, in accordance with embodiments of the present invention.

FIG. 1B is a schematic view of a rear of the handheld touchscreen computing device of FIG. 1A, in accordance with embodiments of the present invention.

DETAILED DESCRIPTION

Figure 2:
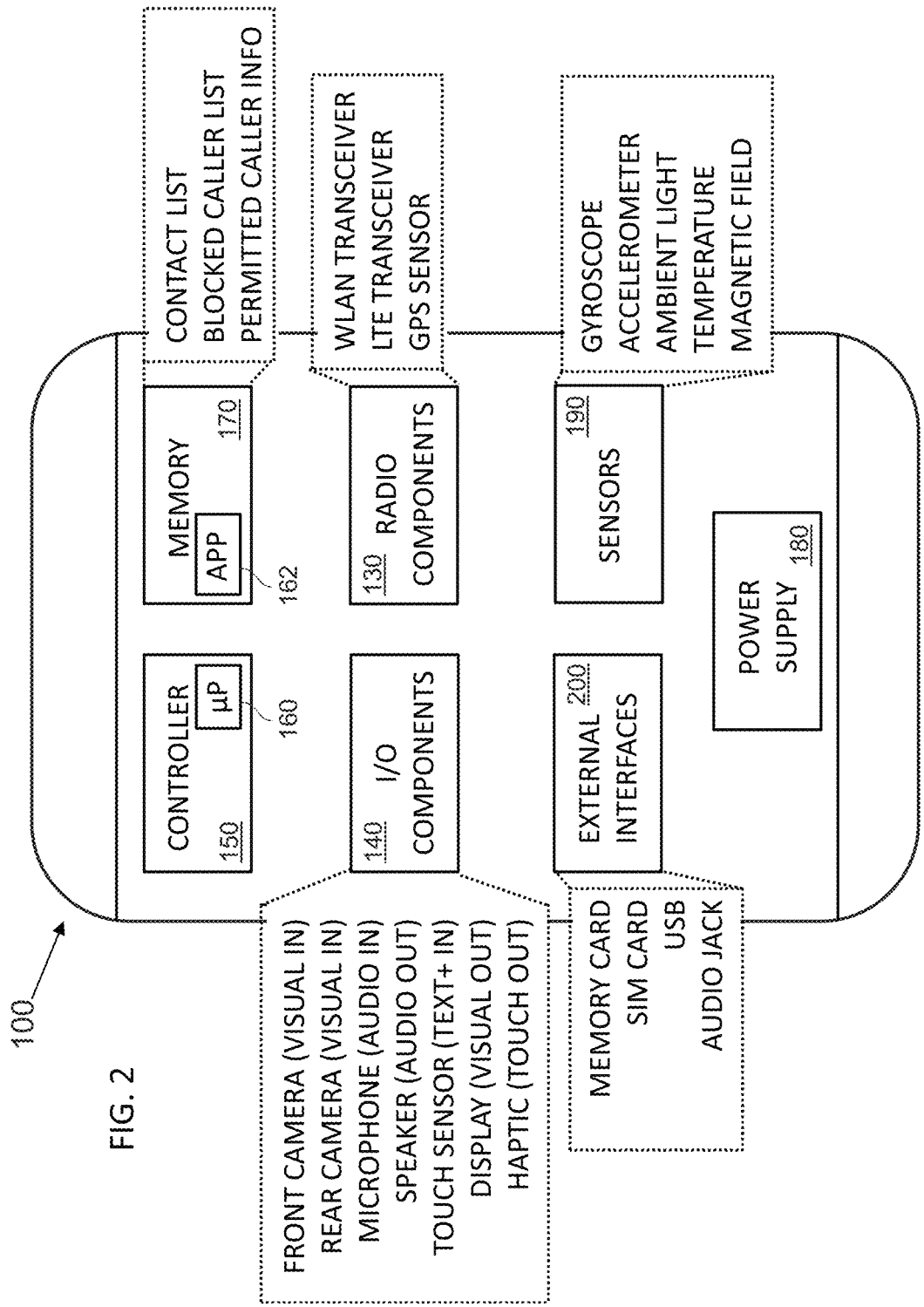
FIG. 2 is a block diagram of the functional components of the computing device of FIG. 1A and FIG. 1B, in accordance with embodiments of the present invention.

Existing telephones have settings that allow the user to filter incoming calls based on whether the telephone number of the caller is found in the user's address book or contact list, or from a sub-set of "favorite" contacts. Calls that are not from known contacts are blocked by terminating the call, or by diverting to voicemail, whereas calls from identified contacts are treated conventionally by the handset, causing the handset to generate a call alert, (i.e. ring, vibrate etc.). For example, mobile telephones operating with Apple iOS or Android OS allow a user to mark the user as unavailable to take incoming calls, except if the caller is from a list of "VIPs" or "starred" entries from the user's phone book, which is a relatively crude solution, and can result in the user missing important and relevant calls, when the important and relevant calls are from an unknown number (i.e. a number not already stored in the user's contact list).

EXAMPLE 1

In general, a user does not want to be unnecessarily disturbed by the user's telephone. Nevertheless, a typical user will want certain types of institution always to be able to contact the user in case of emergency (e.g. child's school, local hospitals, local police forces).

EXAMPLE 2

In general a user does not want to be unnecessarily disturbed by the user's telephone. Nevertheless, the user may have been informed to expect a call, but not been given the telephone number of the caller. Perhaps the user is a tenant of a house which has a damaged roof and the landlord has informed the user that some roofing companies will be making contact that afternoon to arrange a time to visit the property and quote for some roofing repairs.

In both Example 1 and Example 2, it is not possible for the user to know the telephone number of the expected caller, so the user cannot use the user's contact list for filtering.

According to a first aspect of the disclosure, a user equipment with a call filtering feature is provided. The user equipment comprises: an input device operable to allow a user to input a description of a permitted caller, a memory operable to store the permitted caller descriptions which have been inputted; an output device operable to generate a call alert; and a processor which, responsive to detecting an incoming call, is operable to perform call filtering. Call filtering is performed by determining a caller identifier of the incoming call and performing a search by providing the caller identifier to a search engine as a search query and receiving at least one hit of the search engine in response. Each hit is then analyzed to identify search text, which is compared with the permitted caller description(s) to attempt to find a match. If a match if found, then the output device generates a call alert.

In some embodiments, a geographical location associated with at least one hit found by the search engine is determined, and used as an extra filtering condition for finding a match. Namely, finding a match is further conditional on proximity between the hit's geographic location and a further geographic location. The further geographic location can be derived from the permitted caller description or may be associated with the user equipment.

The output device may comprise a display and the call alert may comprise presenting information derived from the match on the display. In this way, the user can assess whether to take the call. The output device may also incorporate conventional call alert components (e.g. comprise at least one of an audio output generator and a vibration generator to generate call alerts in the form of at least one of: a ring tone and a vibration, respectively).

The search engine may be operable to return a ranked list of hits, ranked by relevance, responsive to the search query. The processor may then be operable to compare search text from each of a plurality of the hits in order of the hit's ranking until either a match is found or a threshold number of hits has been processed without a match being found. In some embodiments, the first-ranked hit is an enhanced presentation box of the search engine, in other embodiments, the hits are conventional hits.

The search text may be compared with the permitted caller description(s) using natural language processing, in particular, the natural language processing may assess conceptual similarity between the permitted caller description(s) and the search text. Assessing conceptual similarity may result in a similarity score being obtained. A match is then determined to have occurred when the similarity score exceeds a threshold similarity score. Alternatively, looking for a match could be based on a text-to-text comparison between the search text and the text of the permitted caller description(s). For example, the permitted caller description(s) may comprise one or more keywords which need to be present in the search text for a match to be determined.

Conventional pre-filtering of incoming calls against contacts and blocked callers may also be performed, which is done prior to attempting to find a match to the permitted caller information because conventional pre-filtering will, as a rule, be less computationally intensive and possible based entirely on information stored locally in the user equipment, whereas the permitted caller processing will typically require access to a search engine (i.e. Internet access).

Namely, for known contacts, the user equipment may further comprise a contact memory operable to store caller identifiers of contacts and the processor is operable to compare the incoming call's caller identifier against contact caller identifiers to attempt to find a match. If a match is found, then the call is let through (i.e. the processor instructs the output device to generate a call alert).

Moreover, for blocked callers, the user equipment may further comprise a blocked caller memory operable to store caller identifiers of blocked callers. The processor is operable to compare an incoming call's caller identifier against blocked caller identifiers. If there is a match to a blocked caller, then the call is blocked.

Call blocking may involve various different action options. These include terminating the call; passing the call to voicemail; or re-routing the call (e.g. to a central reception desk or other colleague).

According to a second aspect of the disclosure, a method of call filtering for a user equipment is provided, the method comprising: detecting an incoming call; determining a caller identifier of the incoming call; performing a search by providing the incoming caller's caller identifier to a search engine as a search query and receiving at least one hit of the search engine in response; identifying search text in the at least one hit found by the search engine; comparing the search text with permitted caller description(s) stored in the user equipment to attempt to find a match; and generating a call alert conditional on a match being found.

According to a third aspect of the disclosure, there is provided a computer program stored on a computer readable medium and loadable into the internal memory of a user equipment, comprising software code portions, when the program is run on a user equipment, for performing the method of the second aspect. A user equipment loaded with the computer program may also be provided.

In the following detailed description, for purposes of explanation and not limitation, specific details are set forth in order to provide a better understanding of the present disclosure. It will be apparent to one skilled in the art that the present disclosure may be practiced in other embodiments that depart from these specific details. For example, while the following embodiments will be described with reference to 5G and also 4G networks, it will be appreciated that the technique presented herein is not limited to any type of cellular network access and may be used in conventional fixed line telephone networks or for Internet telephony.

Those skilled in the art will further appreciate that the services, functions, and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Certain terms used in the following detailed description of exemplary embodiments are defined as follows:

Uplink: a transmission path in a direction from a user equipment (UE) to a packet data network (PDN) over a part or the whole of a data link from UE to PDN;

User Agent: a part of a UE and acts as a client in a transport protocol (TP) for communication with a server;

User Equipment: is any device used directly by an end-user to communicate;

Downlink: a transmission path in a direction from a PDN to a UE over a part or the whole of a data link from UE to PDN. A transmission path may be bi-directional (i.e. comprise an uplink and a downlink);

Packet Data Unit (PDU) Connectivity Service: a service that provides exchange of PDUs between a UE and a data network;

PDU Session: an association between the UE and a data network that provides a PDU Connectivity Service;

4G: is the fourth generation of mobile telecommunications technology as defined by the ITU in IMT Advanced, such as Long term evolution (LTE).

5G: is the fifth generation of mobile telecommunications and wireless technology which is still in a study phase (e.g. in Third Generation Partnership Project (3GPP) TR 23.799 version 0.4.0 (Release 14) of April 2016;

WiFi: is an environment and interface allowing an electronic device, such as a UE, to wirelessly connect to, and form part of, a wireless local area network (LAN) (WLAN). Currently, WiFi mainly uses 2.4 GHz and 5 GHz frequency bands;

The sequence diagram and the following supporting description use a number of acronyms, the meaning of which is as follows:
Acronym Description
3GPP Third Generation Partnership Project
CHF-U Connectivity Handling Function on UP/UP Node
CP Control Plane
DN Data Network
eNB evolved Node-B (base station)
IP Internet Protocol
LAN Local Area Network
LTE Long-term evolution POP Point of Presence
PDN Packet Data Network
PDU Packet Data Unit
RAN Evolved Radio Access Network
TP Transport Protocol
UA User Agent
UE User Equipment
UP User Plane
VoLTE Voice Over LTE
VoWiFi Voice Over WiFi A user equipment as presented herein may for example be a mobile phone, smartphone, phablet, tablet, laptop computer, personal computer, smart television or media player, or a fixed line telephone handset device. The user equipment may be a user equipment as defined by one or more telecommunications standards. The computing device may be portable (e.g. a handheld computing device), or fixed. Reference to a call may be Voice Over LTE (VoLTE), Voice Over WiFi (VoWiFi) or any other type of call.

FIG. 1A is a schematic view of a front of a handheld touchscreen computing device, in accordance with embodiments of the present invention. FIG. 1B is a schematic view of a rear of the handheld touchscreen computing device of FIG. 1A, in accordance with embodiments of the present invention. FIG. 2 is a block diagram of the functional components of the computing device of FIG. 1A and FIG. 1B, in accordance with embodiments of the present invention.

Referring to FIG. 1A, the computing device 100 has a smartphone or tablet format. The computing device 100 is arranged in a housing with a front face (e.g. facing outwards from FIG. 1A), a rear face and a bezel forming the edges of a substantially rectilinear object. The front face is mostly taken up with a touch screen display which combines a display 102 (shown displaying a scene with house, smoke and sun in FIG. 1A) with a touch sensitive area 103 (shown with the hatching in FIG. 1A). The touchscreen enables the user to input commands to applications running on the computing device through gestures, which vary from the humble single touch of a point on the display, referred to in the art as a tap, and other single touch gestures, such as a swipe, to multitouch gestures such as the two-finger pinch conventionally used for zooming in and out and rotating. In an exemplary embodiment, gestures refers to touch gestures on a touchscreen. The front face also accommodates a mechanical key, or button 104 and two touch sensor keys or buttons 106, 108, one either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to the front facing camera 101 a microphone 105 for capturing audio and a speaker 107 for outputting audio.

Referring to FIG. 1B, the rear view, a rear facing camera 114 for capturing stills or video images is arranged near the top of the housing facing backwards. A battery 116 is accommodated within the housing and constitutes a power supply (shown with dashed lines in FIG. 1B). The power supply further includes an external power input socket 118 which may be used for powering the device as well as charging the battery. Alongside the power input socket 118 at the bottom of the device another external connector in the form of an audio jack 120 for audio output may be present. Further external interfaces may be provided including various ports, holders and sockets for physical connections. Two internal holders 122, 124 which may be for a SIM card and a memory card or further SIM card are shown in broken lines in FIG. 1B. The memory card may be a data storage device.

Referring now to FIG. 2, which shows selected functional components of the computing device 100. The computing device 100 has radio components 130, input/output (I/O) components 140, a controller 150 associated with a processor 160 and a memory 170, a power supply 180, sensor components 190 and external interfaces 200. The memory 170 is operable to store computer applications ('apps') 162 which comprise software code portions that are loadable into and executable by the processor 160.

The memory 170 has various memory portions. There is a memory portion for storing a contact list which is a data structure storing the user's known contacts which may be accessible and editable via a database app. There is a memory portion for storing a blocked caller list, which is a data structure storing telephone numbers or other caller identifiers which the user has logged as blocked callers, which may be accessible and editable via an app. There is also a further memory portion in which the user can store descriptions, descriptors or characteristics of calls or types of call which the user wishes to permit (i.e. not block, even if they are not known contacts), wherein the descriptions, descriptors or characteristics may be accessible and editable via a database app.

The processor 160 may comprise separate processing units for specialist tasks, such as video processing, speech/audio analysis and/or speech/audio synthesis (e.g. with the aid of natural language processing). The controller and associated processor have the task of controlling the computing device and executing computer programs stored in the memory. The memory may store computer applications for running on the computing device as well as collecting data from the various I/O devices. The controller typically functions to control overall operation of the computing device, in addition to the operations associated with the application programs. The controller processes signals, data, information, and the like, input or output through the above-mentioned components and/or runs application programs saved in the memory, thereby processing or providing a user with appropriate information and/or functions. The user equipment 100 is further operable to use the processor 160 to apply filtering to decide whether or not to generate a call alert responsive to detecting an incoming call.

The radio components 130 include a WLAN transceiver, an LTE transceiver, and a GPS module. The I/O components 140 include a display capable of displaying content and also acting as part of a graphical user interface, wherein the display may be based on a suitable technology, such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing). Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor and a temperature sensor, for example. The external interfaces may include various ports and sockets for physical connections, such as a SIM card, wired LAN connectors, memory cards, audio jack socket, USB ports, and so forth.

The user equipment 100 is operable to use one of the I/O components 140 as an input device (e.g. for audio or text) to allow a user to input a description of a permitted caller. The user equipment 100 is further operable to use one or more of the I/O components 140 as an output device to generate a call alert (e.g. an audio output for sounding a ring tone, or a haptic output to cause the user equipment, or a part thereof, to vibrate).

Figure 3:
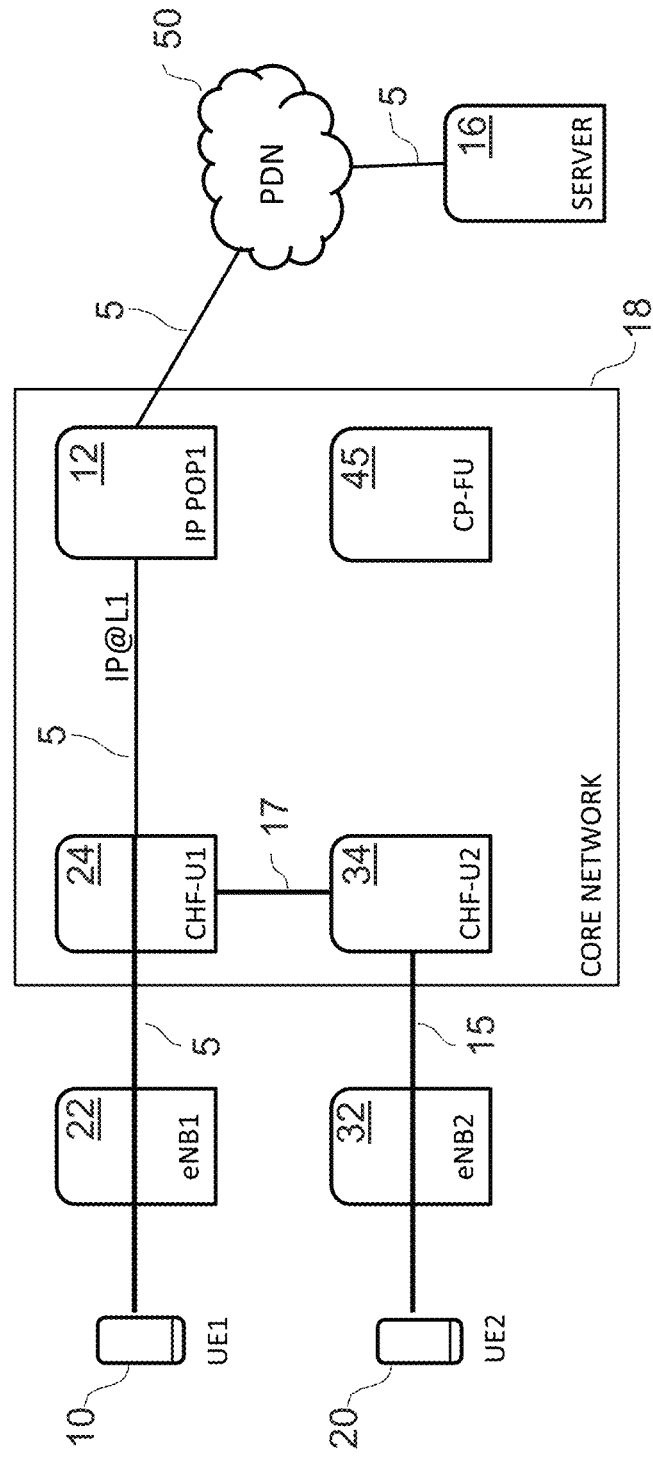
FIG. 3 is a block diagram of user equipment associated with a shared core network, in accordance with embodiments of the present invention.

FIG. 3 is a block diagram of user equipment associated with a shared core network, in accordance with embodiments of the present invention A first user equipment 10 and a second user equipment 20 may be connected to a core network 18. An exemplary embodiment relates to a mobile network, such as those that are being standardized in 3GPP (Third Generation Partnership Project). An exemplary embodiment specifically relates to calls made to a user equipment (UE) by another UE via the mobile network.

The core network 18 comprises a user plane (UP) and a control plane (CP). The CP provides protocols for control and support of one or more user plane functions, specifically: controlling the network access connections to E-UTRAN (evolved UMTS Terrestrial Radio Access Network) or any other radio access network (RAN), such as attaching to and detaching from E-UTRAN; controlling the attributes of an established network access connection, such as activation of an Internet Protocol (IP) address; controlling the routing path of an established network connection in order to support user mobility; and controlling the assignment of network resources to meet changing user demands. The CP function is responsible for CP management and includes handling mobility pertaining to network access. The CP function can be hosted in a CP function unit CP-FU 45, which is shown as being part of the core network 18, but could be situated outside the core network 18. A first UE 10 receives a call from a second UE 20 via a shared core network 18, which is routed from the second UE 20 to the first UE 10 via links 15, 17, and 5 respectively through an evolved NodeB, eNB2 32, a UP node for the second UE 20 having a connectivity handling function (CHF-U) CHF-U2 34, a UP node for the first UE 10 CHD-U1 24 and an eNB, eNB1 22 for the first UE 10. The first UE 10 is also able to make a packet data connection to an Internet application server 16 through the core network 18 and a packet data network (PDN) 50, such as the Internet. More specifically, the data connection in the UP is through an evolved NodeB, eNB, a CHF-U and an IP Point of Presence (IP POP). The IP POP forms part of the core network 18. The first UE 10 has a data connection path 5 through the first eNB1 22, the first CHF-U1 24 and a first IP POP1 12. The second UE 20 is also able to connect in a similar way although this is not illustrated. A control plane (CP) function unit 45 which is responsible for the CP management is also provided, which is shown as being part of the core network 18. The term eNB here is used as a generic term for a radio base station. It is also noted that the CHF-Us and IP POPs could be combined into a single entity. The first connection through IP POP1 is of IP address IP@L1.

The user's input of the permitted caller description may be in the form of natural language voice input which the processor is operable to convert to text. For example, the user may have spoken to a virtual assistant (e.g. APPLE Siri, GOOGLE Assistant, MICROSOFT Cortana—all trademarks) running on the user equipment. Another example would be a voicemail message left for or on the user equipment. The user's input of the permitted caller description may also be received directly in the form of text. For example, the user may input text through a keypad of the user equipment, or the user may mark an email, SMS or other message as being the definition of the permitted caller description.

The user is thus able to use natural language (e.g. voice or text input) to give a free text description, or just some keywords, representing the types of callers they want to allow through. For example, the user could specify that the user does not want to be notified of incoming calls unless they are from a school, or hospital, or police force. Another example would be to specify that calls are permitted from a local roofing company.

When incoming calls are received, the user equipment uses a publicly available search engine to look up the incoming telephone number or other call identifier to look for search results related to that telephone number or other call identifier that also contained one of the keywords specified by the user. For example, if an incoming call is from number 01234 567890, the user equipment could run a search on that number sequence and, if the user equipment search found that the number was associated with a roofing company, the user equipment would notify the user of the incoming call (e.g. by ringing or vibrating, etc.) and display the name of the roofing company to the user, so that the user knows who is calling.

An additional setting could allow the user to specify that search result matches had to be local to them (e.g. the number would have to match a local school, hospital, or police force). Local could be defined as within a certain distance (e.g. expressed as a number of miles) from a specified location or the user equipment's current location.

Continuing the concrete example provided above, the user's landlord has informed the user to expect a call from a roofing contractor, who wants to gain access to the user's home to assess roof repairs. The landlord may have sent a message to the user (e.g. via email, SMS, SNAPCHAT, etc.) or left a voicemail to this effect. On receipt of this information from the landlord, the user can instruct the user equipment to set up a permitted caller description by taking a copy of the message or voicemail, or by parsing or otherwise analyzing the message or voicemail to extract descriptors from the permitted caller description (e.g. by natural language processing of the message or voicemail to extract named entities).

Figure 4:
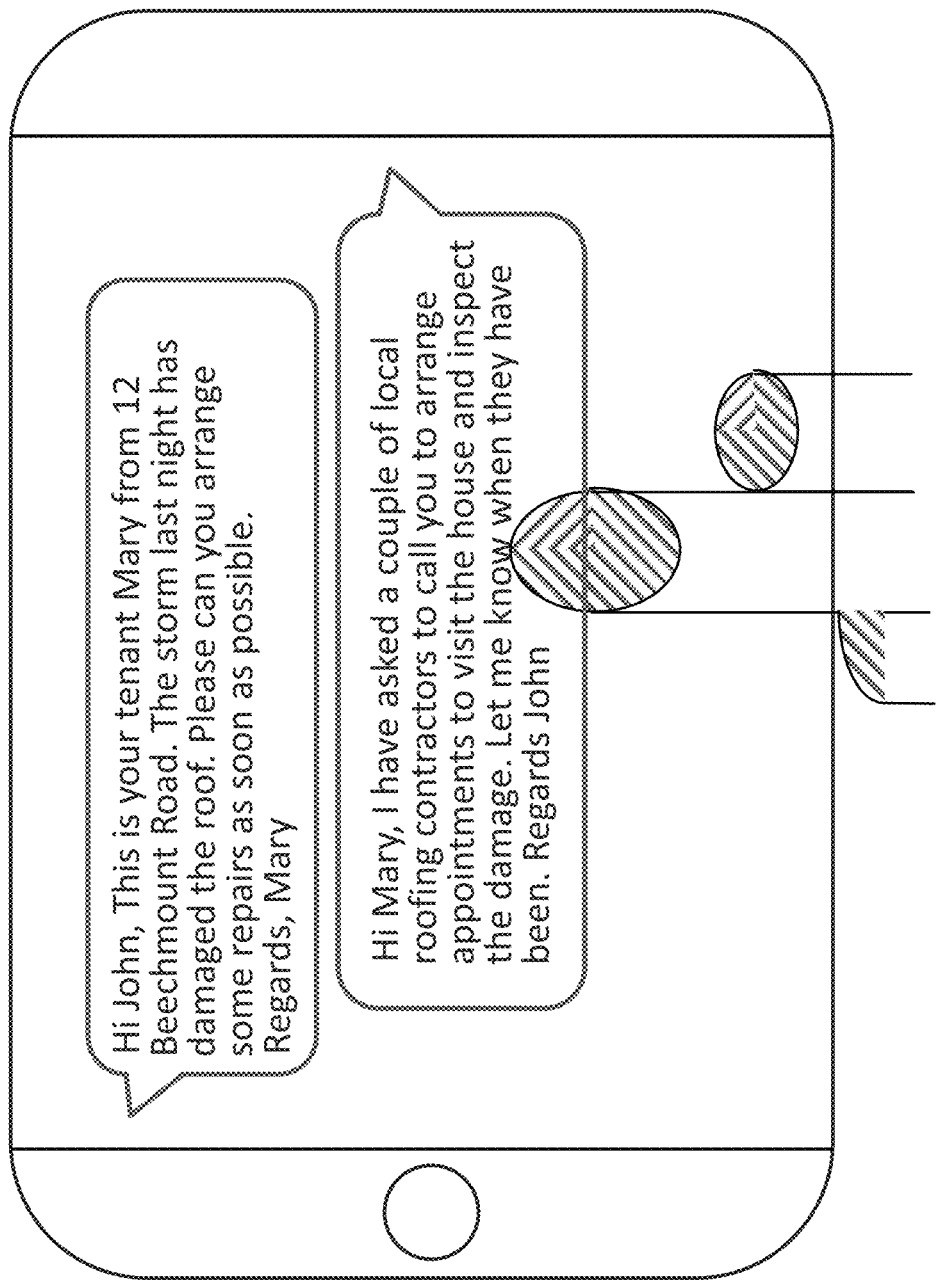
FIG. 4 is a schematic diagram of a device' touchscreen, wherein a user is inputting permitted caller information, in accordance with embodiments of the present invention.

FIG. 4 is a schematic diagram of a device' touchscreen, wherein a user is inputting permitted caller information, in accordance with embodiments of the present invention. As illustrated, the device's touchscreen is displaying a dialogue between two parties John (landlord) and Mary (i.e. tenant and user of the device) that has taken place via a messaging application, an email application, a social media application, or SMS, for example. The text is being read by the user, Mary, a part of who's hand is schematically illustrated; a finger being used to manipulate the text with touch gestures. By a suitable touch gesture (e.g. a double tap on the message from the landlord), the user instructs the user equipment to set up a permitted caller description from the landlord's message text by taking a copy of the message, and optionally the whole dialogue, or at least adjacent messages in the dialogue. The user equipment may save the message text as the permitted call description. Alternatively, the user equipment may parse (i.e. semantically process) the message text using natural language processing, for example, to extract entities from the message text and/or make ontological links between entities in the message text, and save the processed elements as the permitted call description. In another alternative, the permitted call description is both the message text and one or more processed elements which we refer to as descriptors to distinguish the one or more processed elements from the description inputted by the user, e.g. as natural language.

Figure 5:
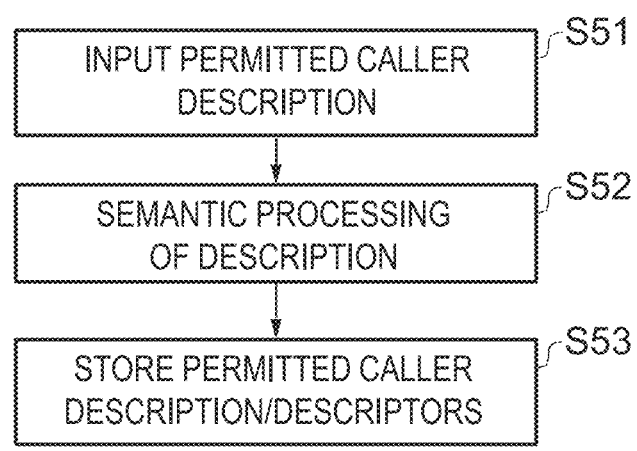
FIG. 5 is a flow diagram of an example input of a permitted call description or descriptors, in accordance with embodiments of the present invention.

FIG. 5 is a flow diagram of an example input of a permitted call description or descriptors, in accordance with embodiments of the present invention. In Step S51, the user equipment receives a command, typically a user command, to input a description of a permitted caller. For example, through a virtual assistant, the user could speak to the user equipment and say, "I am expecting a call from a builder today who is likely to be local to Southampton. Please save to my permitted caller list." In Step S52, the user equipment uses natural language processing first to convert the speech to text and then to extract semantic meaning from the text. Recognizing this is an instruction to augment the permitted caller list and that the relevant entities are—Entity 1: builder, Entity 2: Southampton. In Step S53, the user equipment stores to the user equipment memory the permitted caller description (e.g. both the source text of the user command and the extracted entity information, or just the latter).

Figure 6:
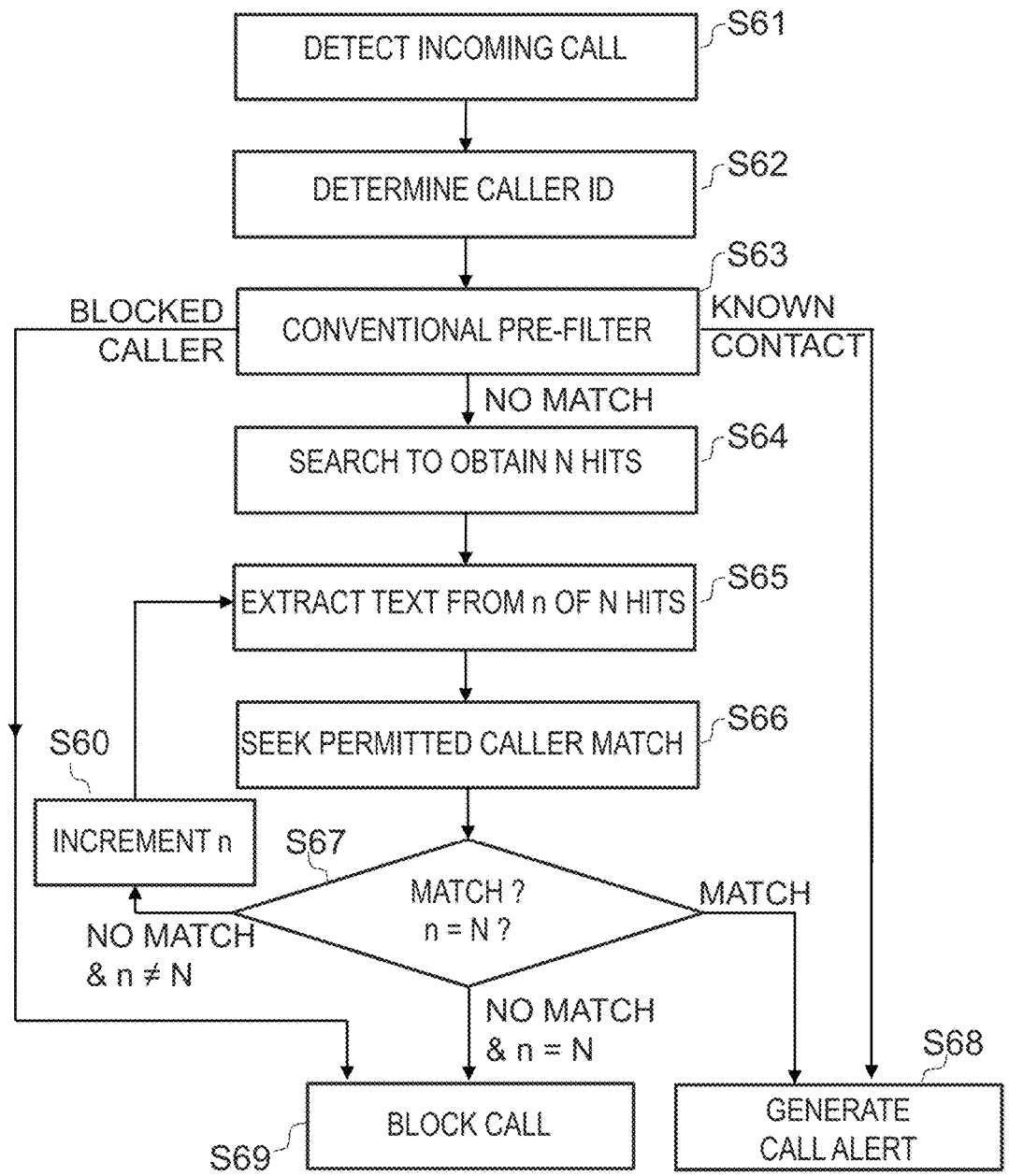
FIG. 6 is a flow diagram of an example logical flow applied by a user equipment to process an incoming call with a call filtering feature to identify permitted calls, in accordance with embodiments of the present invention.

FIG. 6 is a flow diagram of an example logical flow applied by a user equipment to process an incoming call with a call filtering feature to identify permitted calls, in accordance with embodiments of the present invention. In Step S61, an incoming call is detected. In Step S62, a caller identifier is determined from the incoming call. The caller identifier may be a conventional telephone number or some other identifier, such as an email address, URL or social media identifier, which could be a SKYPE name or FACEBOOK personal profile URL, for example. In Step S63, a conventional pre-filter is applied to look-up the caller identifier in the user's contact list and blocked caller list. The conventional pre-filter may also incorporate handling of emergency services numbers. If the caller identifier is found in the user's contact list, then the call handling proceeds directly to generate a call alert, in Step S68. If the caller identifier is found in the user's blocked caller list, the call handling proceeds directly to block the call, in Step S69. If there is no match in the pre-filter, then the call processing proceeds to carry out a check of whether the call has characteristics of a permitted call, for example as input in the process of FIG. 5.

In Step S64, the user equipment performs an Internet search by providing the caller identifier to a search engine as a search query and receiving at least one hit of the search engine in response. This step may involve making a data connection to a server as described with reference to FIG. 3. Alternatively, the user equipment may have access to a search engine through a WLAN connection or in some other way. The call handling is configured to collect a certain number of hits (i.e. N hits where N is an integer from 1 to 5, 10 or 20). A hit counter 'n' is also initialized to 1 at this step. The hits are preferably ranked according to relevance. The first-ranked hit can be an enhanced presentation box of the search engine, as for example provided by the GOOGLE search engine, and the second to Nth ranked hits can be the first to (N−1)th ranked 'normal' hits returned by the search engine. Alternatively, if no enhanced presentation box is provided, or is provided but ignored, then the 1st to Nth ranked hits can be the 1st to Nth ranked 'normal' hits returned by the search engine.

In Steps S65 and S66, the first hit is processed to see if it matches any of the permitted caller descriptions. In Step S65, search text is identified in the first hit and then in Step S65 it is compared with the permitted caller descriptions to attempt to find a match.

In Step S66, the matching can be further conditional on matching a geographical location associated with the hit being processed and a further geographic location derived from the permitted caller description or the user equipment. A location match may be based on proximity (e.g. proximity between two location points), overlap between two regions, or one location being within a region. For example, the further geographic location could be: the user equipment's current location; a previous location; a plurality of recent locations; a home location defined by a subscription linked to the user equipment; or a location set by the user (e.g. a workplace). Proximity may be defined in some embodiments as being within a certain distance of a location (e.g. 20 miles from the current location, or 1 mile from a user's workplace). In other embodiments, proximity may be defined as or by a region (e.g. within London, within the administrative boundary of a city or town, Essex, a county), or the United Kingdom, i.e. a country). In other embodiments, proximity could be defined as a combination of a region and a distance (e.g. within 10 miles of the city limits of London).

In Decision Box S67, if a match is found, then the process flow goes to Step S68 to generate a call alert. On the other hand if no match is found, and there are still hits to process (i.e. n>N) then the hit counter 'n' is incremented in Step S60, and Steps S65 and S66 are repeated to process the second hit. The third option is that no match is found, and there all hits have been processed (i.e. n=N) then the process flow goes to Step S69 to block the call. The process of searching for a match to the permitted caller characteristics is thus an iterative on of comparing the search text, or information derived from the search text, from each of a plurality of the hits in order of their ranking until either a match is found or a threshold number of hits has been processed without a match being found. In this way, instructing the output device to generate a call alert in Step S68 is conditional on a match being found either to a known contact in the pre-filter or to some permitted caller description(s).

In addition to, or instead of, a conventional call alert through a ring tone or vibration, the call alert may incorporate information output via one or more of the I/O devices, for example, the display 102 to provide information relating to the nature of the match which has been made in Step S16 from the permitted caller characteristics or Step S63 from a match to the contact list. For example, the call alert may comprise presenting on the display information derived from the match. The information that is shown on the display could be part or all of the permitted caller description, including any descriptor(s) that are part of the permitted caller description, that led to the match, the identity of the named entity associated with the incoming caller's caller identifier as found by the hit which has led to the match, textual or other information extracted from the search text of the hit that has led to the match, or some other information derived from the combination of search text and permitted caller description which were matched. For example, the display may be, "Call from Solent Roofers Ltd (Southampton Builder)" which is a presentation of the matched entity information (Southampton+Builder) and entity information extracted from the text in the search hit which resulted in the match (Solent Roofers Ltd). It will be understood that by conventional call alert, it is envisaged that an audio output generator or a vibration generator (e.g. haptic output device) can be activated to generate a ring tone or a vibration respectively.

Figure 7:
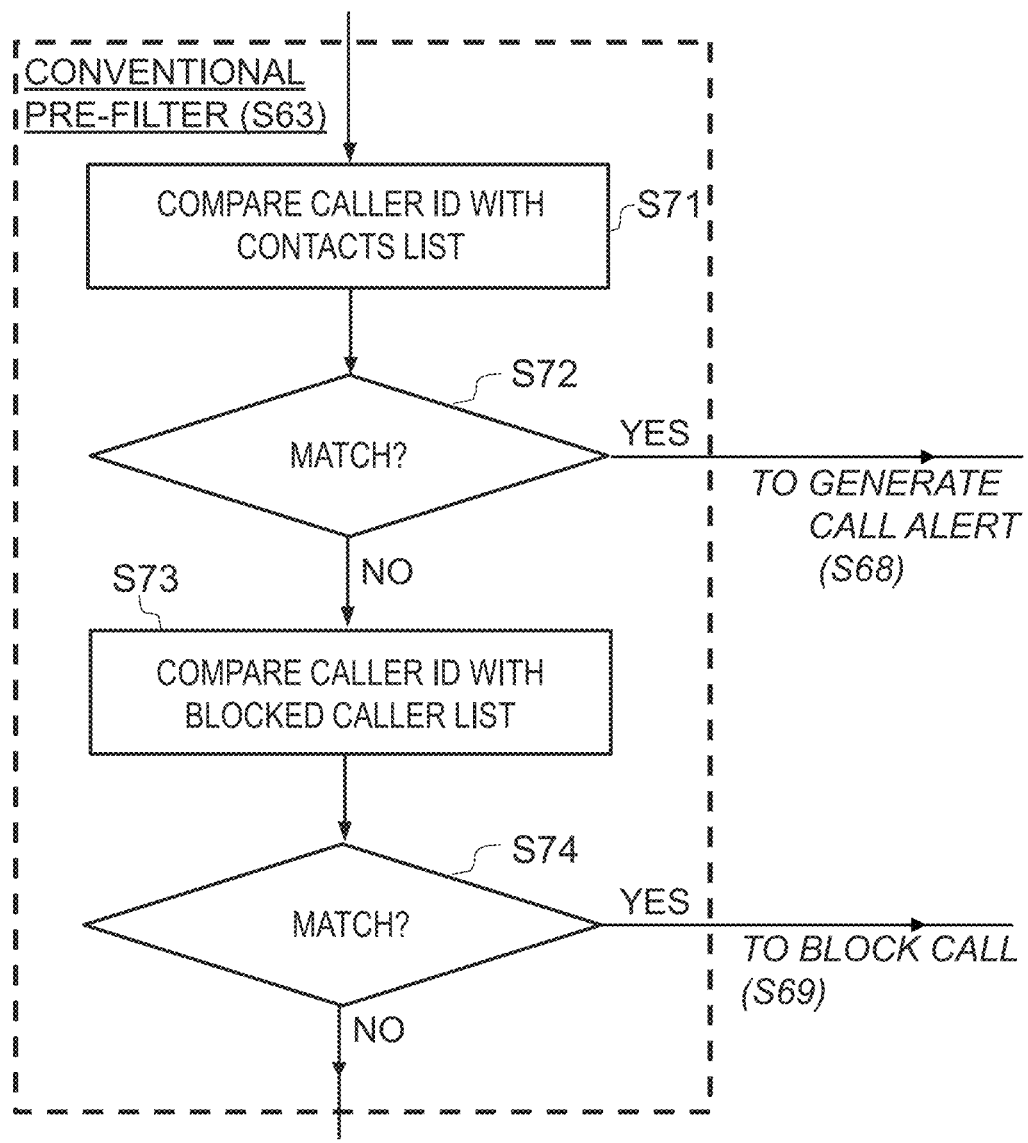
FIG. 7 is a flow diagram showing the pre-filtering of FIG. 6 in more detail, in accordance with embodiments of the present invention.

FIG. 7 is a flow diagram showing the pre-filtering Step S63 of FIG. 6 in more detail, in accordance with embodiments of the present invention. In Step S71, the incoming caller identifier is compared with the contacts list, and in Decision Box S72 if a match is found then the process flow goes to Step S68 as depicted in FIG. 6 to generate a call alert, whereas if no match if found then the process flow goes to Step S73. In Step S73, the caller identifier is checked against the blocked callers list, and in Decision Box S74 if a match is found then the process flow goes to Step S69 as depicted in FIG. 6 to block the call, whereas if no match if found then the process flow goes to Step S64 as depicted in FIG. 6 to check if the incoming call matches any of the permitted caller characteristics. Call blocking may be one of: terminating the call; passing the call to voicemail; or re-routing the call (e.g. to a central reception desk or other selected telephone number). For example, if the call is matched to a blocked caller, the action will usually be to terminate the call, whereas, if the call is neither matched in a positive sense (e.g. contact or permitted caller type) or negatively (e.g. blocked caller), then the action could be any of the above (e.g. route to voicemail or central reception).

In the embodiment described with reference to FIG. 6, the pre-filtering of incoming calls against contacts and blocked callers may be done prior to attempting to find a match to the permitted caller information, since such conventional pre-filtering will as a rule be less computationally intensive and possible based entirely on information stored locally in the user equipment, whereas the permitted caller processing will typically require access to a search engine (i.e. Internet access). However, the pre-filtering could take place at some other point in the process flow (e.g. after the permitted caller filtering or in parallel with the permitted caller filtering).

Comparing the search text with the permitted caller description(s) comprises using natural language processing to assess conceptual similarity between the permitted caller description(s) and the search text. Assessing conceptual similarity results in a similarity score and a match is determined when the similarity score exceeds a threshold, where similarity score can be a semantic value determined between two concepts—in our case between a first concept expressed by the permitted caller description and a second concept extracted from search results based on searching against an incoming caller identifier. Similarity can be determined, for example, according to the teachings of U.S. Pat. No. 8,892,548 B2 ("Ordering Search-Engine Results"), which is hereby incorporated by reference in its entirety, which proposes that in a given ontology, a "semantic value" is computed based on a distance between two concepts, wherein the distance measures the length of the chain between the two concepts and has a low value when the concepts are semantically closed. A relationship between a pair of concepts is represented by a chain of links. The term "semantic distance" is a measure of the similarity between concepts. Semantic distance can be normalized as a number in the range [0,1]. The similarity can then be defined as: one minus semantic distance or any function that increases when the semantic distance decreases.

Instead of using natural language processing for assessing conceptual similarity, the comparison could be done based on a text comparison. That is, comparing the search text with the permitted caller description comprises looking for a text string match between text, such as at least one keyword, associated with the permitted caller description and the search text.

It will be understood that the permitted caller filtering may be switched on and off at the choice of the user.

In summary, there has been described a method of call filtering for a user equipment. The method starts by detecting an incoming call. The method then determines a caller identifier of the incoming call, performing an Internet search by providing the incoming caller's caller identifier to a search engine as a search query and receives one or more hit of the search engine in response. The hits are processed, one after the other in a ranking order of relevance. Search text is identified in each hit and then compared with permitted caller description(s) stored in or for the user equipment to attempt to find a match. If a match is found, then a call alert is generated, whereas if not, then the call is blocked, where blocking may be one of: terminating the call; passing the call to voicemail; or re-routing the call (e.g. to a central reception desk).

In one example, the user equipment takes the telephone number of the incoming call, searches for the telephone number, and scrape that data optionally together with the receiving user equipment's current location and determines if the incoming call is expected (e.g. local builder) or is otherwise of a desired general type (e.g. local school).

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a user equipment such as a smart phone, general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a user equipment, computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present disclosure. In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A smartphone with a call filtering feature, comprising:
    a touchscreen display having a touch sensitive area, wherein a user interacts with the touch screen display displaying a text message received from another smartphone to save the text message as a description of a permitted caller;
    a memory operable to store the description of the permitted caller description, in response to the user interacting with the touch screen display displaying the text message;
    a processor, responsive to detecting an incoming call;
    a computer readable storage device coupled to the processor, wherein the storage device contains program code executable by the processor via the memory device to implement a method for filtering a call, the method comprising:
    searching, by the processor, a caller identifier of the incoming call using a search engine;
    identifying, by the processor, search text in at least one hit found by the search engine;
    determining, by the processor, that the search text matches the description of the permitted caller.

2. The smartphone of claim 1, further comprising:
    identifying, by a processor, a geographical location associated with at least one hit found by the search engine, wherein finding a match is conditional on proximity between the geographic location and a further geographic location.

3. The smartphone of claim 2, wherein the further geographic location is derived from the description of the permitted caller.

4. The smartphone of claim 2, wherein the further geographic location is associated with the smartphone.

5. The smartphone of claim 1, wherein the user is alerted to the match by a call alert.

6. The smartphone of claim 5, wherein the call alert comprises presenting, by the processor, on the touch screen display information derived from the match.

7. The smartphone of claim 5, wherein the call alert comprises at least one of: a ring tone and a vibration, respectively.

8. The smartphone of claim 1, wherein the search engine is operable to return a ranked list of hits responsive to the search query, and the processor is operable to compare search text from each of a plurality of the hits in order of a ranking of the plurality of hits until either a match is found or a threshold number of hits has been processed without a match being found.

9. The smartphone of claim 8, wherein a first-ranked hit is an enhanced presentation box of the search engine.

10. The smartphone of claim 1, wherein the search text is compared with the description of the permitted caller using natural language processing to assess conceptual similarity between the description of the permitted caller and the search text.

11. The smartphone of claim 10, wherein assessing conceptual similarity results in a similarity score and a match is determined when the similarity score exceeds a threshold.

12. The smartphone of claim 1, wherein the search text is compared with the description of the permitted caller by looking for a text match between at least one keyword associated with the description of the permitted caller and the search text.

13. The smartphone of claim 1, further comprising a contact memory operable to store caller identifiers of contacts, and wherein prior to searching, the processor is operable to compare the caller identifier against contact caller identifiers to attempt to find a match and instruct the output device to generate a call alert conditional on a match being found.

14. The smartphone of claim 1, further comprising a blocked caller memory operable to store caller identifiers of blocked callers, and wherein prior to performing the search the processor is operable to compare the caller identifier against blocked caller identifiers to attempt to find a match and blocks the call conditional on a blocked caller match being found.

15. The smartphone of claim 1, further comprising:
    blocking, by the processor, the incoming call conditional on no match being found.

16. The smartphone of claim 15, wherein blocking the call comprises one of: terminating, by the processor, the call; passing, by the processor, the call to voicemail; or re-routing, by the processor, the call.

17. A method of call filtering for a smartphone, the method comprising:
    storing, by a processor of a computing system, a description of a permitted caller, wherein a user interacts with a touchscreen display having a touch sensitive area displaying a text message received from another smartphone to select the text message as the description of a permitted caller;
    searching, by the processor, a caller identifier of the incoming call using a search engine;
    identifying, by the processor, search text in at least one hit found by the search engine;
    determining, by the processor, that the search text matches the description of the permitted caller.

18. The method of claim 17, further comprising:
  blocking, by the processor, the call conditional on no match being found, wherein blocking the call comprises one of: terminating, by the processor, the call; passing, by the processor, the call to voicemail; or re-routing, by the processor, the call.

19. A computer program product, comprising a computer readable hardware storage device storing a computer readable program code, the computer readable program code comprising an algorithm that when executed by a computer processor of a computing system implements a method of call filtering for a smartphone, the method comprising:
  storing, by a processor of a computing system, a description of a permitted caller, wherein a user interacts with a touchscreen display having a touch sensitive area displaying a text message received from another smartphone to select the text message as the description of a permitted caller;
  searching, by the processor, a caller identifier of the incoming call using a search engine;
  identifying, by the processor, search text in at least one hit found by the search engine;
  determining, by the processor, that the search text matches the description of the permitted caller.

20. A smartphone user equipment loaded with the computer program of claim 19.

\* \* \* \* \*